(12) United States Patent
Walker

(10) Patent No.: US 6,179,180 B1
(45) Date of Patent: Jan. 30, 2001

(54) CARRIER ACCESSORY FOR RECREATIONAL VEHICLES

(76) Inventor: John F. Walker, Wait Rd., R.F.D. #1, Box 125, St. Regis Falls, NY (US) 12980

(*) Notice: Under 35 U.S.C. 154(b), the term of this patent shall be extended for 0 days.

(21) Appl. No.: 09/348,228

(22) Filed: Jul. 6, 1999

(51) Int. Cl.$^7$ .................... B60R 7/08; B60R 9/06
(52) U.S. Cl. .................... 224/401; 224/449; 224/457; 248/153; 248/311.2
(58) Field of Search .................... 224/401, 443, 224/449, 457, 448; 248/311.2, 153, 154, 107

(56) References Cited

U.S. PATENT DOCUMENTS

| | | | |
|---|---|---|---|
| 591,390 | * 10/1897 | Dunnigan . | |
| 593,978 | * 11/1897 | Boehm . | |
| 1,001,416 | * 8/1911 | Lloyd . | |
| 1,460,760 | 7/1923 | McGee . | |
| 2,092,456 | 9/1937 | Hunker . | |
| 2,904,299 | * 9/1959 | Dalton | 248/293 |
| 3,135,391 | 6/1964 | Umstead . | |
| 3,232,441 | 2/1966 | Mitscherling . | |
| 3,339,814 | * 9/1967 | Carbine . | |
| 3,734,439 | * 5/1973 | Wintz | 248/224 |
| 3,968,912 | * 7/1976 | Horwitz . | |
| 4,011,951 | * 3/1977 | Boyer | 211/71 |
| 4,248,397 | * 2/1981 | Casper | 248/138 |
| 4,526,124 | * 7/1985 | Hartwell | 114/219 |
| 4,773,348 | * 9/1988 | Rowley | 211/118 |
| 4,930,591 | 6/1990 | Lanius et al. . | |
| 5,071,100 | * 12/1991 | Sweeny | 248/313 |
| 5,083,632 | 1/1992 | Saito et al. . | |
| 5,310,147 | 5/1994 | Billman . | |
| 5,474,273 | * 12/1995 | Vinal | 248/311.2 |
| 5,595,333 | 1/1997 | Boston . | |
| 5,727,642 | 3/1998 | Abbott . | |
| 5,878,929 | 3/1999 | Leonard . | |
| 6,045,017 | * 4/2000 | Connell | 224/148.7 |

OTHER PUBLICATIONS

Cabela's "Master Catalog" (Fall 1998) pp. 329–331.

* cited by examiner

Primary Examiner—Stephen P. Garbe
(74) Attorney, Agent, or Firm—Wall Marjama & Bilinski

(57) ABSTRACT

A carrier accessory which is releasably attachable to the support rack of an off-road or other recreational vehicle includes a frame having a plurality of substantially circular members, each sized to retain a cylindrical article such as a bucket or pail. The frame further includes releasable attachment members which allow the accessory to clamp onto an existing support rack, the circular members being cantilevered from the accessory frame.

9 Claims, 3 Drawing Sheets

CARRIER ACCESSORY FOR RECREATIONAL VEHICLES

FIELD OF THE INVENTION

The invention relates to the field of carriers for recreational vehicles such as all terrain vehicles (ATVs), and more particularly to a carrier accessory which is releasably engageable with an existing vehicle storage rack.

BACKGROUND OF THE INVENTION

Recreational or all terrain vehicles (ATV's) have become increasingly popular as a mode of transportation, particularly for varied types of off-road activities. Typically, the ATV is equipped with a storage rack which is commonly and integrally found at the front and/or rear of the vehicle. The rack consists of a horizontal supporting surface made up of a series of tubular steel members which are spaced in a manner to allows items, such as storage containers, to be releasably attached using bungee cords with hooks or the like for transport.

With the increasing popularity of such vehicles, the common storage rack, as described, is inefficient for transporting certain items which may be needed in order to participate in a number of outdoor activities. This inefficiency has prompted modifications or additions to existing storage racks. For example U.S. Pat. No. 5,878,929, issued to Leonard, describes a support device for retaining either a bow adapter or a gun rack which is mounted to the rear rack of an ATV. The device utilizes an anchoring member allowing the passage of respective U-bolts to enable releasable attachment. U.S. Pat. No. 5,595,333, issued to Boston, describes a similar releasable attachment used in conjunction with the storage rack for retaining a bow, rifle, shotgun or other similar implement.

Another outdoor activity for which the use of recreational vehicles is finding increased favor is the sport of ice fishing, owing to the size, overall maneuverability, and lightweight nature of ATVs in general. The typical ice fisherman, however, commonly utilizes a number of cylindrical pails or buckets, each of which contain bait, fishing poles, and/or other related materials such as tipups, beverages, clothing and mittens. Though storage racks typically found on ATVs allow a number of items to be conveniently retained during travel, these racks are not presently conducive to allow pails, buckets or similarly constructed items to be transported securely. Therefore, alternate means must somehow be arranged when using off road vehicles for such activities.

SUMMARY OF THE INVENTION

It is a primary object of the present invention to improve the state of the art of off road recreational vehicles.

It is another primary object of the present invention to increase the overall capability of an ATV or similar off-road vehicle for retaining and allowing transport of certain types of containers.

Therefore and in accordance with a preferred aspect of the present invention, there is provided a releasable carrier accessory for a recreational vehicle, said vehicle including a storage rack having at least one transverse support rod, said carrier accessory including:

a frame;

a plurality of substantially circular hoop-like support members fixedly secured to said frame, said support members being planarly disposed and each having a diameter which is adapted for supporting a pail; and means for releasably attaching the frame of said accessory to said rack.

Preferably, the frame includes a plurality of spaced U-shaped attachment members, each member having a spacing which closely matches that of the transverse support rod, the U-shaped members producing a releasable clamping fit with the rack, but maintaining a suitable locking relation for the carrier accessory.

Otherwise, the frame of the carrier accessory can include hook-like members which can otherwise engage other portions of the storage rack of the all-terrain vehicle, depending for example on the configuration of the rack and the vehicle used.

In a preferred embodiment, the carrier accessory can be made as a single piece or can consist of a number of welded parts to form a unitary construction.

The carrier accessory can also include brace members or the like in order to rigidly support the cylindrical support members which are cantilevered from the frame of the accessory.

An advantage of the described carrier assembly is that increased versatility and functionability of a recreational or other vehicle can be achieved without requiring significant modifications to the vehicle.

Another advantage of the described carrier accessory is that a number of pails, buckets or other cylindrically shaped articles can be effectively retained and transported in a simple, balanced, and reliable manner. The above greatly aids, for example, ice fishermen who previously had inadequate means for effective use of a recreational vehicle.

Another advantage is that the described accessory does not require modifications to the vehicle or to a vehicle storage rack, while also being easily installed and removed, as needed.

These and other objects, features and advantages all become apparent when reading the following Detailed Description in conjunction with the accompanying drawings.

DETAILED DESCRIPTION

The following description relates to a carrier accessory made in accordance with a pair of preferred embodiments in use with a recreational off-road vehicle and integral support rack. It will be readily apparent to one of adequate skill that the inventive concepts described herein can be applied to other suitable vehicles, including farm vehicles such as tractors.

Figure 1:
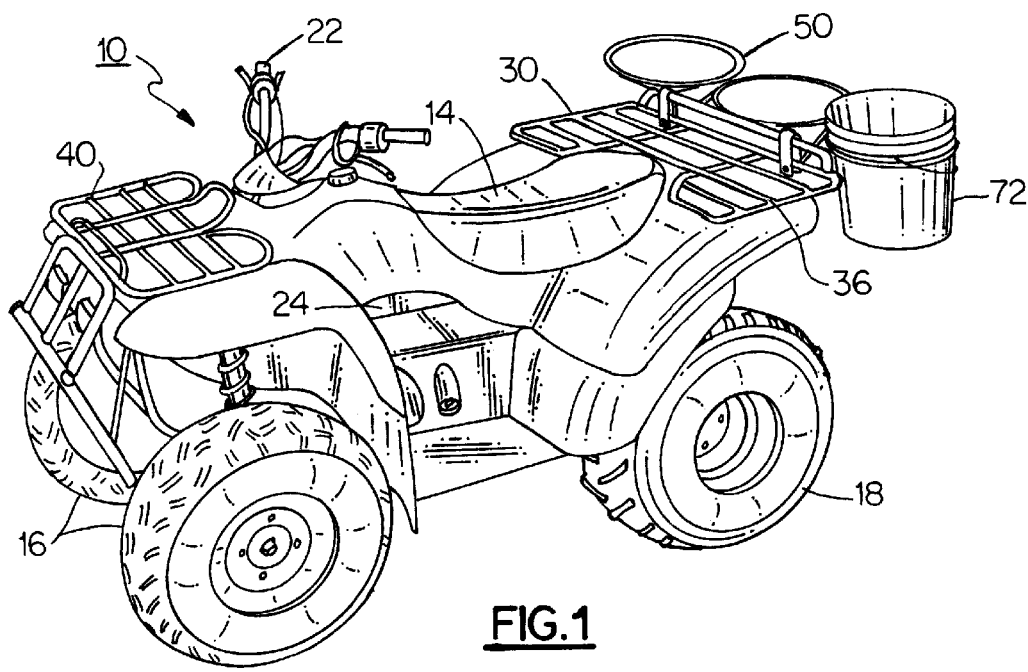
FIG. 1 is a side perspective view of a recreational vehicle including a carrier accessory made in accordance with a preferred embodiment of the present invention.

Furthermore, and depending on the vehicle, the present accessory can alternately be attached, for example, to a front or otherwise disposed rack of the vehicle having adequate supporting structure, such as the rack illustrated in FIG. 1. The discussion also utilizes such terms as "top", "bottom", "lateral", "side", and the like throughout. These terms are only intended to provide a frame of reference with respect to the accompanying drawings and are not intended to be limiting of the present invention.

Turning first to FIG. 1, a typical all terrain recreational vehicle (ATV) 10 is shown. In terms of background, the ATV 10 includes a compact motorized vehicle frame 12 which includes a saddle-like rider's seat 14 with a fuel tank 24 being disposed in front of and beneath the seat. The vehicle 10 further includes a pair of front balloon tires 16 and a pair of rear balloon tires 18 and a steering mechanism comprising a column (not shown) and steering wheel 22 permitting the rider to turn the front tires. Specific details relating to the overall mechanical features of the vehicle are known to those in the field and require no further discussion as to the present invention. Furthermore, other similar vehicles, such as so-called "three-wheelers" having only a single front tire and a pair of rear tires, (not shown) are among such as described in U.S. Pat. No. 5,083,632, which is herein incorporated by reference in its entirety are intended to be included among those vehicles covered by the carrier accessory of the present invention.

Figure 4:
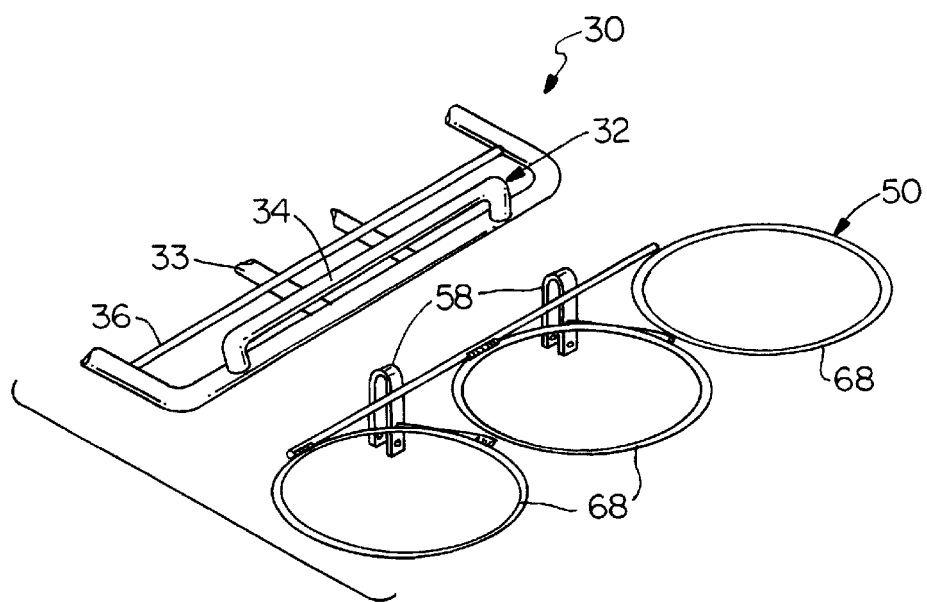
FIG. 4 is a top perspective view of the carrier accessory of FIGS. 1–3 in conjunction with the storage rack of the recreational vehicle of FIG. 1.
Figure 2:
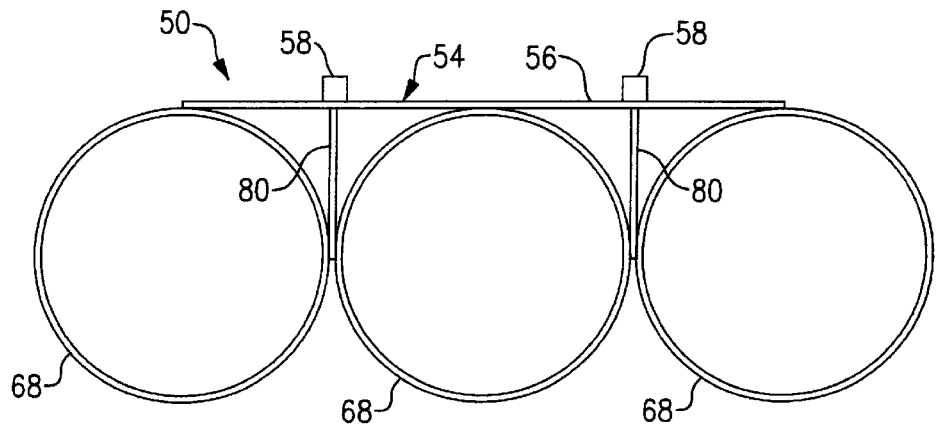
FIG. 2 is a plan view of the carrier accessory of FIG. 1.
Figure 3:
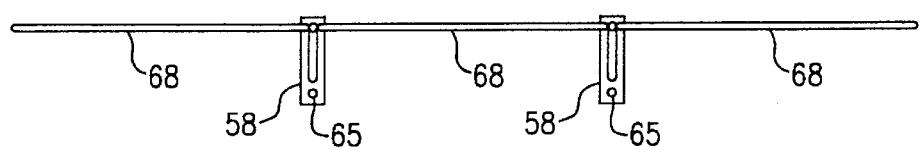
FIG. 3 is a front elevational view of the carrier accessory of FIGS. 1 and 2.

Referring to FIGS. 1 and 4, the vehicle 10 further includes a rear storage rack 30 attached to the vehicle frame 12 which, according to this embodiment, includes an interconnected series of respective sets of parallel and spaced longitudinal and transverse tubular members 33, 36. These tubular sections 33, 36 define a horizontal supporting surface. The storage rack 30 also includes a raised rear section 32 having an upper transverse rear supporting rod 34 located at the rearmost portion of the rack. As shown and noted above, the vehicle 10 may also include a front storage rack 40 having similar features.

Referring to FIGS. 1–5, a carrier accessory 50 in accordance with a preferred embodiment of the present invention includes an accessory frame 54 defined by a lateral or transverse cross member 56 having a pair of U-shaped attachment members 58 disposed on a front side of the cross member. The U-shaped attachment members 58 are equally spaced from corresponding ends of the transverse cross member 56 and include adjacent inner and outer legs 62, 63. Each of the U-shaped attachment members 58 include a defined spacing between their respective inner and outer legs 62, 63 and an open end 55 which is downwardly disposed in relation to the accessory frame 54. Preferably, the spacing between the inner and outer legs 62, 63 allows the open end 55 thereof to be fitted onto and over the transverse support rod 34 of the raised rear section 32 of the storage rack 30, as well as the rearmost transverse tubular section 33, as described in greater detail below. Each of the bottom portions of upper and lower legs 62, 63 of the U-shaped supporting members 58 include aligned openings 65 for receiving a threaded fastener 70 to provide an additional locking aid.

The carrier accessory 50 further includes a series of substantially circular hoop-like supporting members 68 welded or otherwise connected to the rear side of the transverse cross member 56. Each adjacent hoop member 68 according to this embodiment is made from a section of cold-rolled steel that is tangentially secured to one another, such as by welding or other known means, so as to form a horizontal planar arrangement with the hoop members 68 also being tangentially welded to the rear side of the transverse cross member 56 so as to be cantilevered therefrom.

Each of the substantially circular hoop-like supporting members 68 includes a defined inner diameter 71 sized to retain a cylindrical article, such as a pail 72. In this embodiment, three (3) hoop-like members 68 are used which collectively span the overall length of the transverse cross member 56.

A pair of brace members 80 extend from a lower portion of the inner leg 62 of each U-shaped supporting member 58 toward the corresponding points of connection between adjacent circular supporting members 68 at approximately a 45 degree or other suitable angle to provide additional stability for the carrier accessory 50.

Referring to FIGS. 1–5 and in operation, the U-shaped attachment members 58 are aligned with the transverse supporting rod 34 of the raised rear section 32 of the storage rack 30 and are pushed downwardly into engagement. Adequate clearance is provided such that the cantilevered circular support members 68 are maintained at a height which is substantially coincident with the top of the storage rack 30. When attached, and as particularly shown in FIG. 5, each of the U-shaped attachment members 58 is disposed over the transverse support rod of the rear raised section 32 as well as the rearmost transverse tubular section of the frame to provide adequate securement to the storage rack 30. A pair of fasteners 70 can be attached through aligned openings 65 optionally to firmly but releasably anchor the accessory 50 in place.

Figure 5:
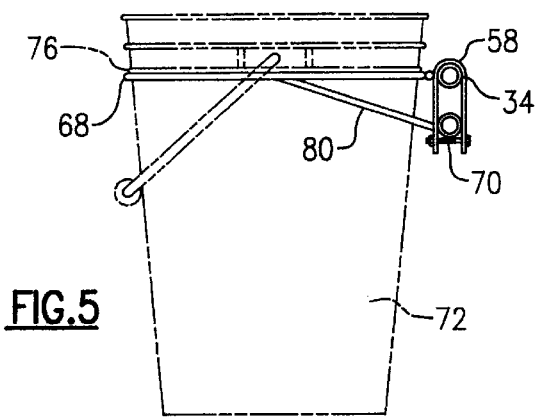
FIG. 5 is a partial side elevational view of the assembled carrier assembly depicting the inclusion of a pail retained within the assembly.

Once attached, a pail 72 (only one of which is shown in FIGS. 1 and 5) can easily be placed within each of the substantially circular supporting members 68 such that an upper exterior circumferential lip 76 of each pail is supported by the periphery of each supporting member. According to the present embodiment, up to 40 pounds total can be easily supported by the accessory, though choice of material among other variable factors can be optimized to provide greater capability.

Figure 6:
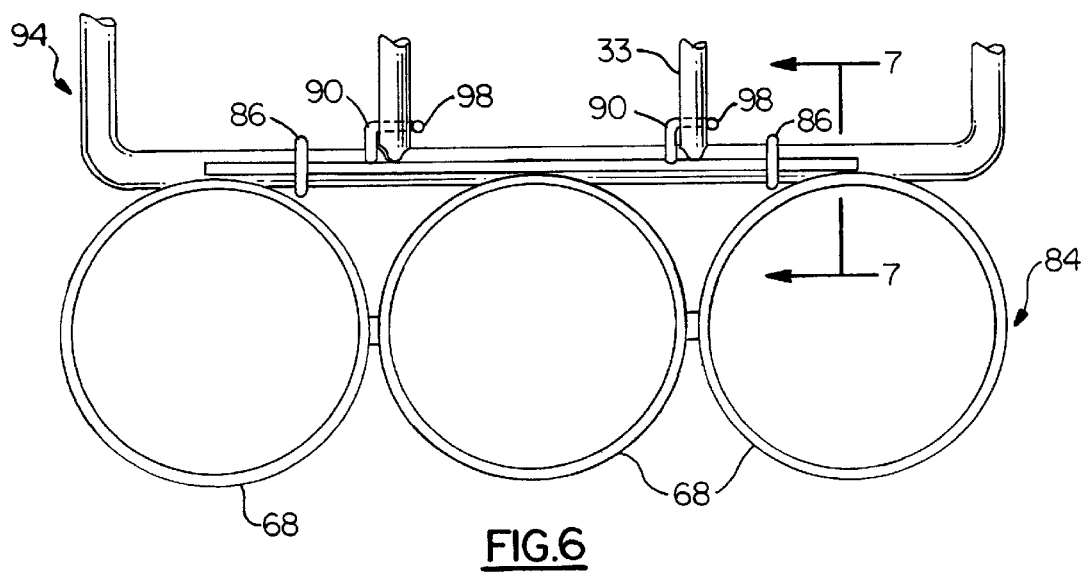
FIG. 6 is a partial top view of a carrier assembly made in accordance with a second embodiment of the invention as attached to a storage rack of a recreational vehicle.
Figure 7:
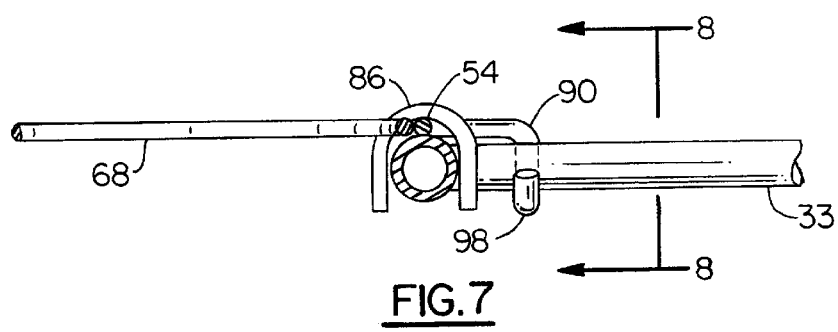
FIG. 7 is an enlarged side elevational view taken in section about line 7—7 of FIG. 6 showing the attachment of the carrier accessory.
Figure 8:
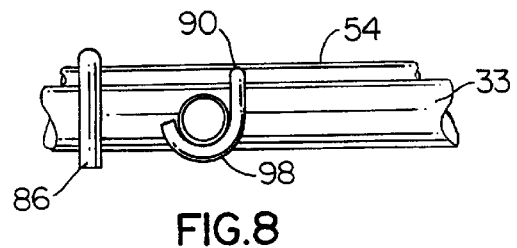
FIG. 8 is an enlarged front view, taken in section from line 8—8 of FIG. 7 further depicting the attachment features of the carrier accessory of FIGS. 6 and 7.

Other techniques can be used to attach a carrier accessory to a recreational vehicle, depending for example on the type of storage rack used. A second embodiment of a carrier accessory 84 is herein described with reference to FIGS. 6–8. For the sake of clarity, similar parts are labeled with the same reference numerals.

Like the preceding, the carrier accessory 84 includes an accessory frame 85 which preferably includes a transverse or lateral rod-like member 54 made from a suitable material such as cold-rolled steel. The accessory 84 also includes a plurality of substantially-circular hoop like members 68 which are tangentially secured to one another and to the rear side of the frame, such as by welding to a rear side of the transverse rod 54.

According to this embodiment, and in lieu of using a single pair of U-shaped attachment members, this carrier accessory 84 utilizes two pairs of attachment members, namely a pair of top retaining members 86 and an interior pair of inwardly curved bottom retaining members 90 which engage respective tubular portions 33, 36 of a vehicle storage rack 94. The storage rack 94 is quite similar to the one previously described but not having the raised rear portion.

In operation, the carrier accessory 84 is attached by first aligning and engaging the bottom retaining members 90 with a pair of longitudinal tubular portions 33 of the storage rack 94 and placing the inwardly curved portions 98 beneath each respective tubular portion, thereby securing the accessory into a releasable locking engagement. The top retaining members 86 are provided to provide redundant engagement with the rearmost transverse tubular member 36 and to prevent rotation of the accessory 84 once attached. According to this embodiment, each of the top retaining members 86 preferably has a shallow U-shaped configuration which overlies the rearmost lateral tubular member 36. Upon securing the accessory 84 to the storage rack 94, the circular supporting members 68 are configured to retain pails 72, FIG. 5, in the manner previously described.

Parts List for FIGS. 1–7

10 ATV
12 vehicle frame
14 rider's seat
16 front tire
18 rear tires
20 steering column
22 steering wheel
24 fuel tank
30 rear rack
32 rear section
33 longitudinal tubular sections
34 transverse supporting rod
36 lateral tubular sections
50 carrier accessory
54 accessory frame
55 open end
56 transverse/lateral cross member
58 U-shaped attachment members
62 inner leg
63 outer leg
64 spacing
68 substantially circular supporting members
71 inner diameter
72 pail/bucket
76 projecting circumferential lip
80 brace members
84 carrier accessory
86 top retaining members
90 bottom retaining members
94 rear storage rack
98 inwardly curved sections Though the preceding has been described in terms of a single preferred embodiment, it will be readily apparent that various modifications and changes can be made which are well within the spirit and scope of the invention as defined by the following claims.

I claim:

1. In combination, a carrier accessory supporting a plurality of pail-like articles on a recreational vehicle, said vehicle including a storage rack having at least one tubular support member, said carrier accessory comprising:

a frame; and means for releasably attaching said frame to at least one tubular support member of said storage rack;

said frame including a plurality of horizontally disposed and substantially circular support members depending from said frame, each of said support members having a hoop-like configuration and an inner diameter sized to support said pail-like article, and in which each pail-like article includes an upper circumferential lip having a diameter which is larger than the inner diameter of a said support member to cause said pail-like article to be retained by the support member.

2. A combination as recited in claim 1, wherein said releasable attaching means includes at least one U-shaped attachment member, said U-shaped attachment member having a pair of spaced leg segments, the spacing between the leg segments being smaller than the corresponding diameter of a transverse support rod of said storage rack such that said at least one U-shaped attachment member can be placed in clamping relation therewith.

3. A combination as recited in claim 1, wherein each of said circular support members is tangentially secured to an adjacent circular support member forming a planar arrangement.

4. A combination as recited in claim 3, wherein each of said circular support members is tangentially secured to said frame such that said circular members are cantilevered.

5. A combination as recited in claim 1, wherein said circular support members are integral to said frame.

6. A combination as recited in claim 4, wherein each of said circular support members is welded to said frame.

7. A combination as recited in claim 2, including a pair of U-shaped attachment members and at least one brace member extending at an angle from each said U-shaped attachment member to said circular supporting members.

8. A combination as recited in claim 1, wherein said accessory includes three circular supporting members.

9. A combination as recited in claim 1, including a pair of attachment members, each of said attachment members including an inwardly curved portion for engaging a longitudinal tubular section of a vehicle storage rack.

* * * * *